United States Patent
Koyama

(10) Patent No.: US 6,865,021 B2
(45) Date of Patent: Mar. 8, 2005

(54) INCIDENT ILLUMINATION UNIT AND MICROSCOPE TO WHICH INCIDENT ILLUMINATION UNIT IS APPLIED

(75) Inventor: Kenichi Koyama, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 10/253,078

(22) Filed: Sep. 24, 2002

(65) Prior Publication Data

US 2003/0063378 A1 Apr. 3, 2003

(30) Foreign Application Priority Data

Sep. 27, 2001 (JP) ........................................ 2001-298604

(51) Int. Cl.$^7$ .............................................. G02B 21/00
(52) U.S. Cl. ..................... 359/381; 359/368; 359/383; 359/699; 359/700
(58) Field of Search ................................. 359/694–706, 359/383, 425, 426, 385, 390, 381, 368

(56) References Cited

U.S. PATENT DOCUMENTS 5,210,644 A * 5/1993 Nomura ...................... 359/694
5,677,791 A * 10/1997 Yoshibe et al. .............. 359/554
6,437,912 B2 * 8/2002 Shiba et al. ................. 359/383

FOREIGN PATENT DOCUMENTS

| JP | 06-23017 U | 3/1994 |
| JP | 10-073768 A | 3/1998 |

* cited by examiner

Primary Examiner—Drew A. Dunn
Assistant Examiner—Joshua L Pritchett
(74) Attorney, Agent, or Firm—Frishauf, Holtz, Goodman & Chick, P.C.

(57) ABSTRACT

An incident illumination unit which can be installed in a slot of an incident illumination device to which a field stop unit or an aperture stop unit is installed, comprises an optical element holding part configured to hold an optical element, a focus mechanism which moves the optical element holding part along an incident illumination axis of the incident illumination device, an insertion and withdrawal mechanism which moves the focus mechanism to a vertical direction to the incident illumination axis, and a outer frame which integrally accommodates the optical element holding part, the focus mechanism and the insertion and withdrawal mechanism and has a slot shape which is inserted and positioned to the slot part of the incident illumination device.

10 Claims, 5 Drawing Sheets

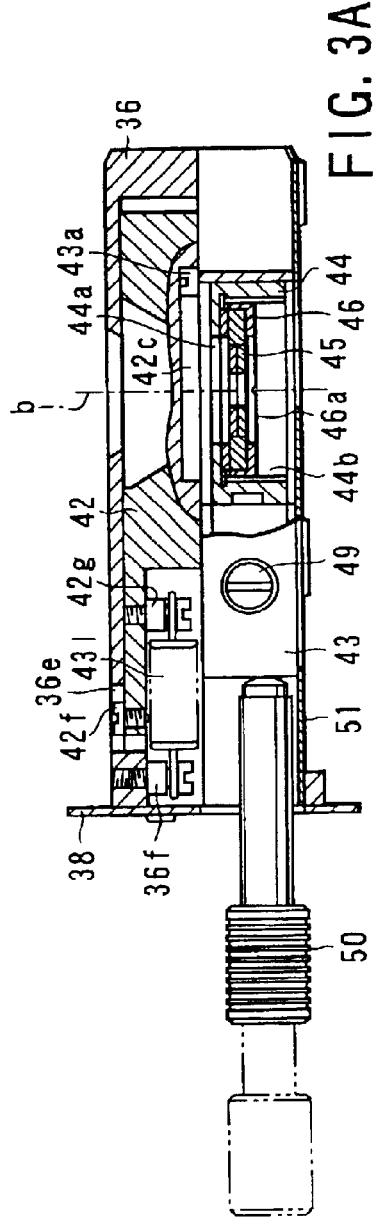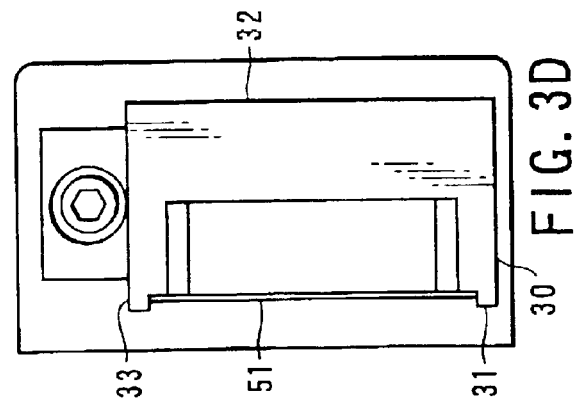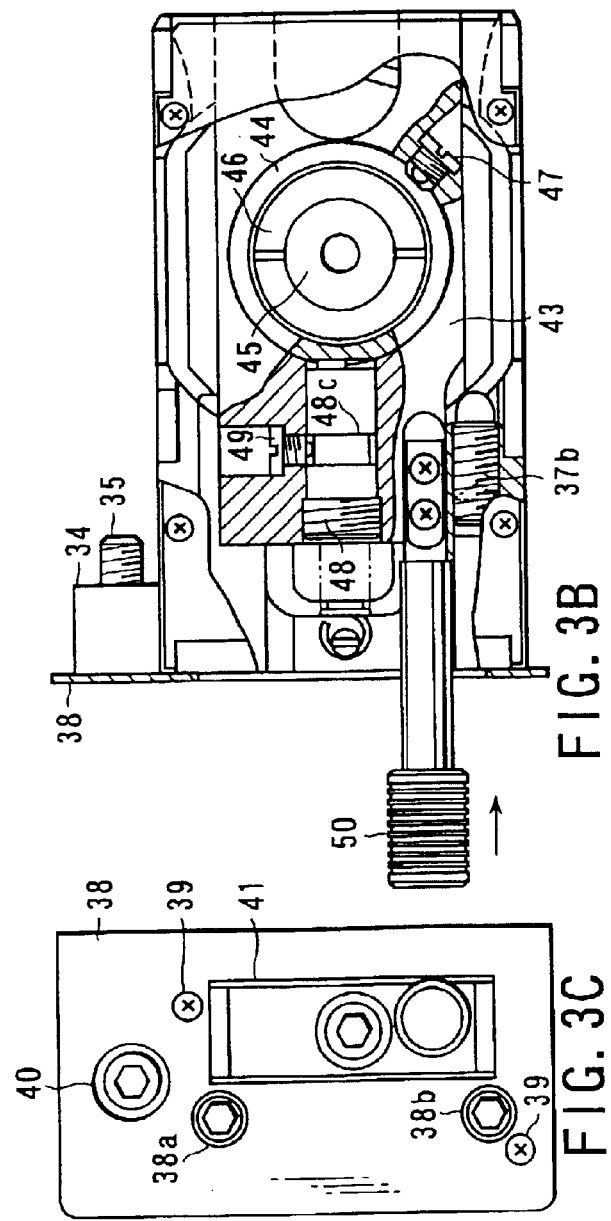

INCIDENT ILLUMINATION UNIT AND MICROSCOPE TO WHICH INCIDENT ILLUMINATION UNIT IS APPLIED

CROSS-REFERENCE TO RELATED APPLICATIONS

This application is based upon and claims the benefit of priority from the prior Japanese Patent Application No. 2001-298604, filed Sep. 27, 2001, the entire contents of which are incorporated herein by reference.

BACKGROUND OF THE INVENTION

1. Field of the Invention

The present invention relates to an incident illumination unit provided to an illumination device for incident fluorescence observation used in a bioresearch field and a microscope to which an incident illumination unit is applied.

2. Description of the Background Art

In the incident fluorescence observation used in the bioresearch field, for instance, there is a case that the illumination with a specific wavelength is irradiated only to the specific area (minute area) other than the observation area. For instance, there is a case of irradiating the specific wavelength to perform a Caged release, and, in this case, the incident illumination device has a function to irradiate a specific area different from the incident illumination, usually.

As means for irradiating the illumination only to such a specific area (minute area), a method of arranging a stop to a conjugate position to the sample and projecting a stop shape to the sample surface is usually adopted. In the illumination device for general incident fluorescence observation, the field stop which is arranged to the conjugate position to the sample, can adjust the stop diameter, and comprises a centering mechanism which can be positioned on the illumination axis is built in.

Such a field stop mechanism is disclosed in the Japanese Utility Application KOKAI Publication No. 6-23017. The field stop has a configuration in which the field stop moves along the direction of the illumination axis by synchronizing with the stop diameter adjustment. This is aimed to correct the field stop image blurring according to the stop diameter change which occurs because of the aberration of the lens group (Hereafter, called as a, "FS projection lens group") to project the field stop to the sample side, and to project the stop on the sample side strictly.

Moreover, the stop which can adjust the stop diameter similarly and can adjust the centering is disclosed in the Japanese Patent Application KOKAI Publication No. 10-73768 though it is not a field stop, and the illumination axis direction position of the stop is changed by configuring the stop as a unit, and reversing the direction of the installation of the unit.

However, the field stop mechanism is integrally provided to a part of the incident illumination system etc. inside the microscope in the technology described in the Japanese Utility Application KOKAI Publication No. 6-23017. Therefore, an arbitrary stop (element) which is requested by the user cannot be arranged on the incident illumination axis. In a word, the stop shape of a built-in the microscope variable diameter is only a circle and a minimum diameter of this kind of stop is generally limit to 0.5 mm to 1 mm, therefore it is difficult to narrow the diameter to a more minute area. Therefore, the stop of a minute diameter which satisfies the request of the user cannot be easily arranged on the incident illumination axis.

Moreover, if the aberration by the wavelength of the illumination is not considered in addition to the aberration of the FS projection lens to use the illumination of a variety of wavelength band in the incident fluorescence illumination, and the field stop cannot be projected to the sample surface strictly. In the technology described in the Japanese Utility Application KOKAI Publication No. 6-23017, it is not possible to correspond to the adjustment against besides the aberration of such FS projection a lens.

In addition, the stop cannot be inserted and withdrawn in the technology described in the Japanese Utility Application KOKAI Publication No. 6-23017 to the illumination path. Therefore, when a whole image is observed by the illumination with a different wavelength band after the wavelength band in a specific range of the sample for instance is illuminated, it is necessary to change the stop diameter during the observation. Therefore, when this work is repeated, annoying work of adjusting the stop diameter in every case within the specific range is occurred.

Moreover, the technology of the Japanese Patent Application KOKAI Publication No. 10-73768 has the problem that the direction of the illumination axis and the position of the stop cannot be continuously adjusted in addition to a similar problem as mentioned above. Therefore, the user cannot accurately arrange the stop at an arbitrary position.

BRIEF SUMMARY OF THE INVENTION

An incident illumination unit, which can be installed in a slot of an incident illumination device to which a field stop unit or an aperture stop unit is installed, according to one aspect of the present invention comprises an optical element holding part configured to hold an optical element; a focus mechanism which moves the optical element holding part along an incident illumination axis of the incident illumination device; an insertion and withdrawal mechanism which moves the focus mechanism to a vertical direction to the incident illumination axis; and an outer frame which integrally accommodates the optical element holding part, the focus mechanism and the insertion and withdrawal mechanism and has a slot shape which is inserted and positioned to the slot part of the incident illumination device.

An incident illumination unit, which can be installed in a slot of the incident illumination device to which a field stop unit or an aperture stop unit is installed, according to another aspect of the present invention comprises an optical element holding part configured to hold an optical element and having a focus ditch at a lateral face thereof; an insertion and withdrawal part having a focus hole which can move the optical element holding part along a direction of an incident illumination axis and engage it along an orthogonal direction to the incident illumination axis and which penetrates to an engagement hole; a centering part which is movable and rotatable in a plane perpendicular to the incident illumination axis; and an outer frame having a slot shape, which accommodates the optical element holding part, the insertion and withdrawal part, and the centering part as one body, and which is inserted and positioned in the slot part of the incident illumination device. A focus axis inserted in the focus hole has a pin provided eccentrically to a point surface thereof which is connected with a focus ditch formed on an outer surface of the optical element holding part along a circumferential direction, of the optical element holding part. The insertion and withdrawal part is formed in a direction along the slide ditch of the centering part, and has a stopper which is inserted in a guide ditch having two stopper contact surfaces which restrict a range of movement of the insertion and withdrawal part. A pair of centering machine screws are arranged at a symmetrical positions with respect to a length direction center line of the length hole of the outer frame and are contacted to a lateral surface of the centering part. A centering spring draws in the centering part in a direction to be in contact with the centering machine screws which are installed in the outer frame. The centering part is inserted in the length hole formed in the outer frame, and moves along the length hole and turns around the length hole.

A microscope according to another aspect of the present invention comprises an incident illumination device which comprises a lamp house; an incident illumination unit installed detachably/attachably to the above-mentioned incident illumination device; and an eyepiece to observe a light from a sample.

As a result, according to the present invention, an arbitrary optical element can be adjusted and arranged at a predetermined position of the incident illumination device accurately, and the insertion and withdrawal onto the incident illumination optical axis can be performed with ease and good reproducibility.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3A to FIG. 3D show a schematic configuration of the incident illumination unit according to the first embodiment;

DETAILED DESCRIPTION OF THE INVENTION

Figure 1:
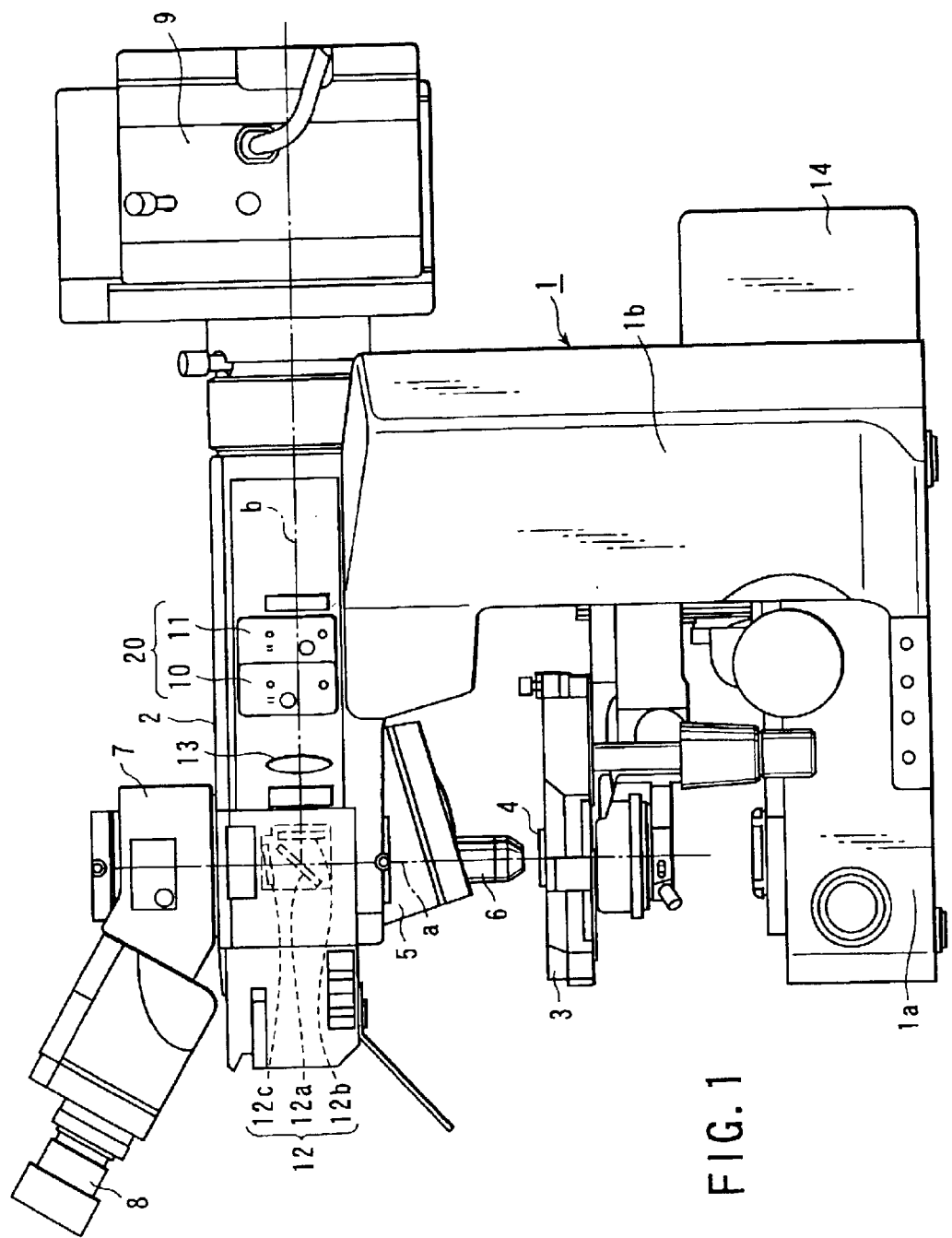
FIG. 1 a schematic configuration of the microscope (upright frame) comprising an incident illumination device into which an incident illumination unit according to the first embodiment of present invention can be installed.

Hereinafter, embodiments of the present invention will be explained referring to the drawings.
(First Embodiment)

FIG. 1 shows a schematic configuration of a microscope (upright frame) comprising an incident illumination device into which an incident illumination unit of the present invention can be installed.

In FIG. 1, the microscope main body 1 has a horizontal base 1a and a trunk 1b formed to stand upright to the base 1a. The incident illumination device 2 is arranged in a parallel direction to the base 1a at the point part of the trunk 1b.

In the trunk 1b of the microscope main body 1, a stage 3 is provided with a possible vertical motion in the optical axis direction of the objective 6 (observation optical axis a), described later. The specimen 4 is put on the stage 3.

The revolver 5 is provided to a point of the incident illumination device 2. Two or more objectives 6 are provided to the revolver 5 opposed to the specimen 4 on the stage 3. And, the objective 6 is selectively changed on observation optical axis a by the rotation operation of the revolver 5. Moreover, a tube 7 having at least one lens is provided above the incident illumination device 2. An eyepiece 8 is provided to the tube 7.

A lamp house 9 is provided to the incident illumination device 2. The lamp house 9 has a mercury lamp as the light source for the incident illumination (not shown in the drawings) and a collector lens arranged on the optical road axis of the source of the light incident illumination.

The incident illumination device 2 has an illumination optical system. The field stop unit 10 and the aperture stop unit 11 are arranged at the FS position and the AS position on incident illumination axis b which passes though the illumination optical system. In this case, each of the stops of the field stop unit 10 and the aperture stop unit 11 is arranged at the conjugate position to the front focus position and the rear focus position of the objective 6. The field stop unit 10 and the aperture stop unit 11 can be detached from the side of the incident illumination device 2.

The projection lens 13 is arranged on the incident illumination axis b. In addition, the mirror unit 12 is arranged at the intersection of the observation optical axis a and the incident illumination axis b. The mirror unit 12 has a dichroic mirror 12a, an excitation filter 12b, and an absorption filter 12c. The incident illumination which is incident along the incident illumination optical axis b passes though the excitation filter 12b and is bent by the dichroic mirror 12a by 90°, and is irradiated to the surface of the specimen 4 on the stage 3 through the objective 6 on observation optical axis a. And, light from the specimen 4 penetrates the objective 6, the dichroic mirror 12a, and the absorption filter 12c. The mirror unit 12 can be detached from the incident illumination device 2.

The penetration light source 14 is provided under the trunk 1b of the microscope main body 1. The illumination from the penetration light source 14 is incident to the specimen 4 from the lower side of the stage 3 through the optical system of the transmitted illumination arranged in the base 1a. The light which penetrates the specimen 4 is led to the eyepiece 8 through the objective 6.

In the microscope as configured above, the illumination irradiated from the lamp house 9 is led to the mirror unit 12 through the aperture stop unit 11, the field stop unit 10, and projection lens 13 configured inside the incident illumination device 2. When the illumination passes each stop of the aperture stop unit 11 and the field stop unit 10, the illumination amount and the illumination area can be adjusted by adjusting the stop diameter.

After only a necessary wavelength band is selected with the excitation filter 12b and is bent by the dichroic mirror 12a by 90°, the illumination led to the mirror unit 12 is irradiated to the specimen 4 through the objective 6.

Here, the specimen 4 is adjusted to be arranged at the front focus position of the objective 6 by moving the stage 3 along the direction of the observation optical axis a (focusing). After passing through the objective 6 and penetrating the dichroic mirror 12*a*, unnecessary light of the originated light (fluorescence here) from specimen 4, caused by irradiating the specimen 4 with the illumination light, is removed with the absorption filter 12*c*, and the observation can be performed through the tube 7 and the eyepiece 8.

Figure 2:
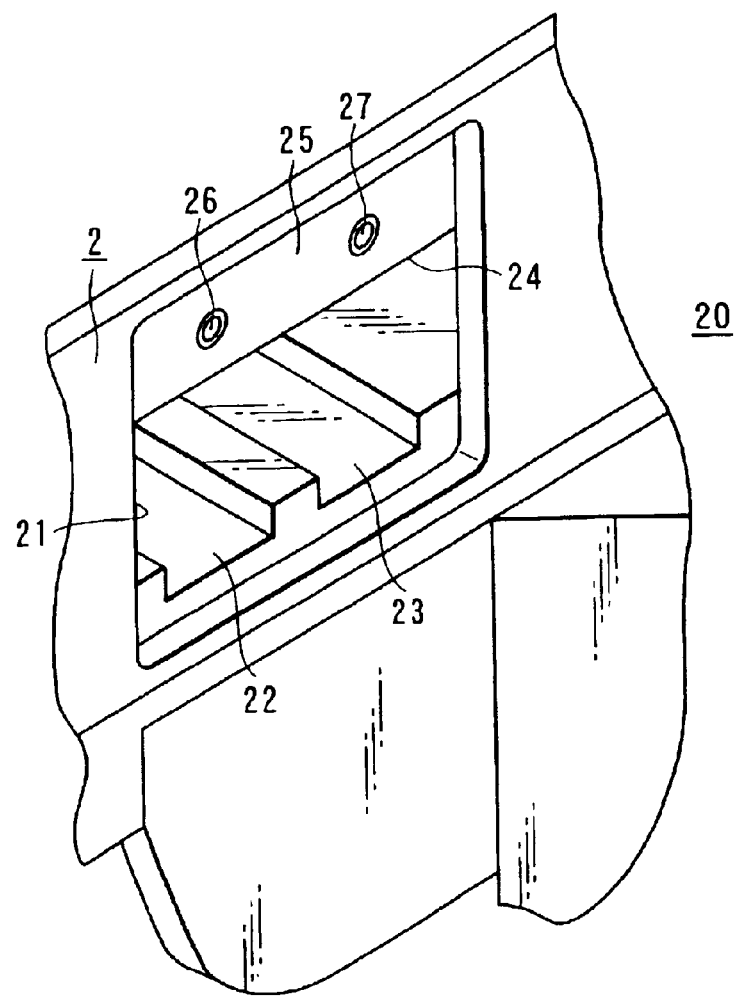
FIG. 2 shows a schematic configuration of an installation slot of the field stop unit and the aperture stop unit provided to the incident illumination device according to the first embodiment.

FIG. 2 shows the installation slot 20 of the field stop unit 10 and the aperture stop unit 11 provided to the incident illumination device 2. An opening 21 is provided on the side of incident illumination device 2. At an inside of the opening 21, ditch parts 22 and 23 which have recessed shapes are provided in an orthogonal direction to the incident illumination axis b to guide the insertion and withdrawal of field stop unit 10 and aperture stop unit 11. A ceiling 24 is provided opposed to the ditch parts 22 and 23 and limits the upper position of the field stop unit 10 and the aperture stop unit 11. A touch surface 25 is provided to fix the field stop unit 10 and the aperture stop unit 11 in the opening 21, and includes screw holes 26 and 27 for fixation.

Figure 4:
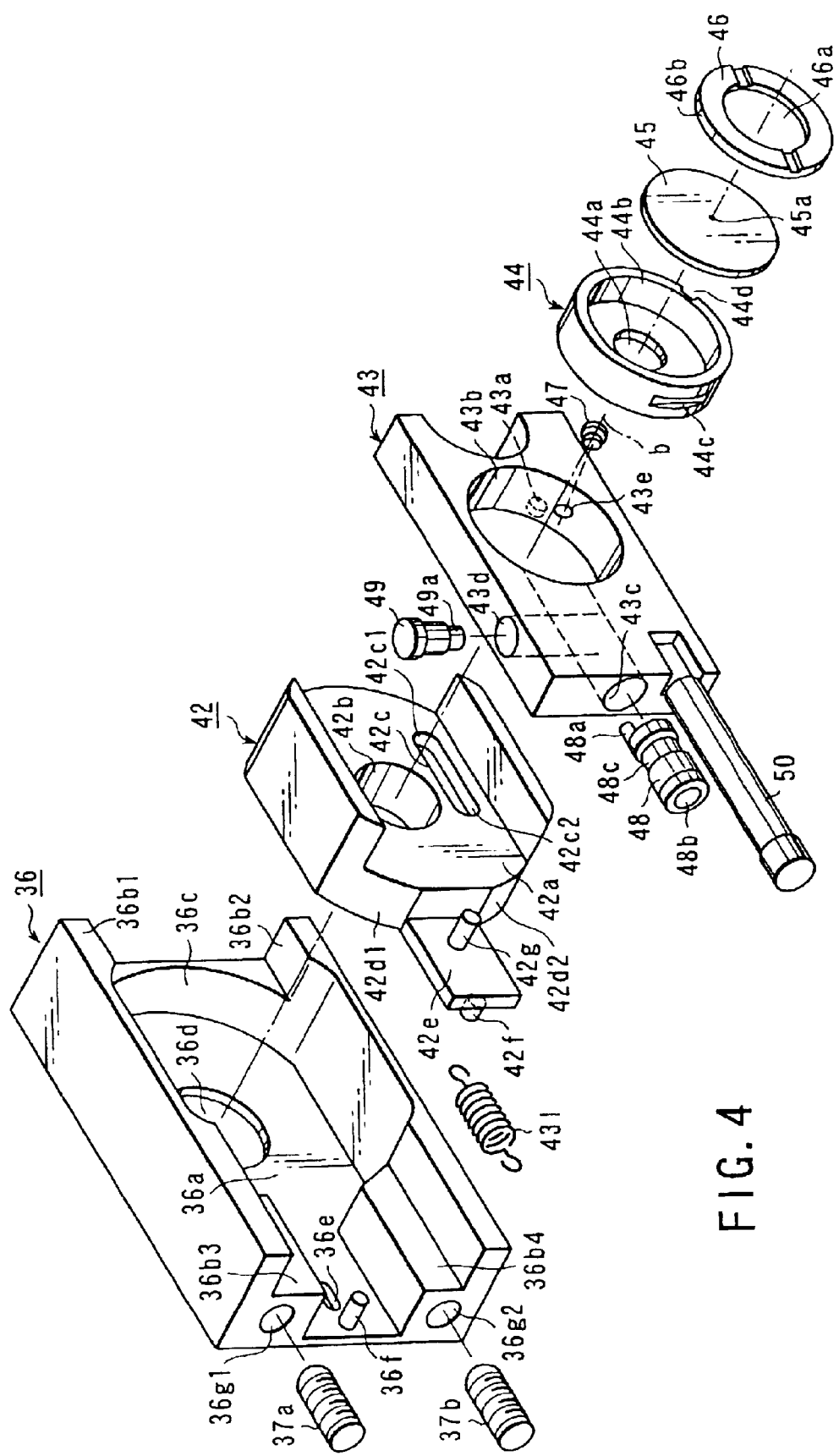
FIG. 4 is a decomposition oblique perspective of the incident illumination unit of the first embodiment.

FIG. 3A to FIG. 3D show the schematic diagram of the incident illumination unit installed in the installation slot 20 of the incident illumination device 2 instead of the field stop unit 10 (or, the aperture stop unit 11). FIG. 4 shows the decomposition oblique perspective figure in the main part of FIG. 3A to FIG. 3D.

The incident illumination unit comprises an outer frame with a slot shape comprising four surfaces 30, 31, 32, and 33 which can be installed in the space enclosed by ditch part 22 (23) of the installation slot part and ceiling 24 shown in FIG. 2, with a contact surface 34 touching the contact surface 25, and a fixing screw 35 screwed into the fixing screw hole 26 (27).

A pair of sidewalls 36*b*1 and 36*b*2 are formed to the side edge where the base 36*a* is opposed at the outer frame 36 as shown in FIG. 4. The arch concave part 36*c* is formed on the base 36*a*. The hole part 36*d* is formed at the center part of the concave part 36*c* to pass the illumination. In addition, the length hole 36*e* is formed on the opening edge side of the arch concave part 36*c* on the base 36*a*. The spring stop pin 36*f* is provided outside of the length hole 36*e*. In addition, the step parts 36*b*3 and 36*b*4 are formed at the edge of the base of the sidewalls 36*b*1 and 36*b*2 on the opening edge side of an arch of the concave part 36*c* on the base 36*a*. The centering screw holes 36*g*1 and 36*g*2 are formed in parallel and in symmetric positions with respect to a length direction center line of length hole 36*e* to the steps part 36*b*3 and 36*b*4. The centering machine screws 37*a* and 37*b* comprise a spherical point and a tool insertion shape on another edge and are respectively screwed into the centering screw holes 36*g*1 and 36*g*2.

As shown in the FIG. 3C, a board 38 having a shape fitted to the opening 21 is fixed to the outer frame 36 with machine screws 39. This board 38 has machine screw holes 38*a*, 38*b*, an insertion hole 40 of fixing screw 35, and a rectangular hole part 41 on the concentric circle of centering screw holes 36*g*1 and 36*g*2.

Returning to FIG. 4, the centering frame 42 which configures a part of the centering mechanism is inserted into an arch concave part 36*c* of the outer frame 36. This centering frame 42 has a similar shape to a concave part 36*c*. The centering frame 42 is formed with a shape of one size smaller than the concave part 36*c* so that the centering frame 42 can move a predetermined distance in the concave part 36*c*. A recess slide ditch 42*a* with a recessed shape is formed parallel to the length direction of the length hole 36*e* of the outer frame 36 in the centering frame 42. The hole part 42*b* to pass the illumination is formed at the center part of the bottom of the slide ditch 42*a*. In addition, the guide ditch 42*c* is formed parallel to the direction along the slide ditch 42*a* at the side of the hole part 42*b*. The stopper 43*a* of the insertion and withdrawal part 43 (described later) is inserted in the guide ditch 42*c*. The guide ditch 42*c* has two stopper contact surfaces 42*c*1 and 42*c*2 to restrict the range of the movement of the insertion and withdrawal part 43 by contacting the stopper 43*a*. The centering frame 42 comprises the contact surfaces 42*d*1 and 42*d*2 to which the points of the spherical point parts of centering machine screws 37*a* and 37*b* are contacted at the lateral face on the opening edge side of an arch concave part 36*c* of outer frame 36. At the edge having these contact surfaces 42*d*1 and 42*d*2, a projection part 42*e* is provided. To the projection part 42*e*, the centering pin 42*f* inserted in the length hole 36*e* of the outer frame 36 and the spring fixation pin 42*g* are provided.

The centering spring 431 is provided between the spring fixation pin 42*g* of the spring stop pin 36*f* and the centering frame 42 of the outer frame 36. As a result, the force is applied along the direction in this contact of the contact surfaces 42*d*1 and 42*d*2 of the centering frame 42 to the point part of the centering machine screws 37*a* and 37*b*. Under such a condition, by inserting the centering pin 42*f* in the length hole 36*e* of the outer frame 36, the movement along the length hole 36*e* for the centering and rotation of the centering frame 42 which centers on centering pin 42*f* inserted in length hole 36*e* can be performed.

The insertion and withdrawal part 43 is held slidably and movably to the slide ditch 42*a* of the centering frame 42. The insertion and withdrawal part 43 has the stopper 43*a* inserted in the guide ditch 42*c* of the centering frame 42. As for the insertion and withdrawal part 43, the range of the movement along the slide ditch 42*a* is restricted by the stopper 43*a*. The engagement hole 43*b* is formed in the center part of the insertion and withdrawal part 43. In a state that the stopper 43*a* of the insertion and withdrawal part 43 contacts to the stopper contact surface 42*c*1 of the guide ditch 42*c* of the centering frame 42, the engagement hole 43*b* is formed to locate a center line of the engagement hole 43*b* in the same axis as the incident illumination optical axis b.

The focus hole 43*c* which penetrates to the engagement hole 43*b* along the direction (direction which is perpendicular to incident illumination axis b) where the insertion and withdrawal part 43 is moved is formed on the edge surface in the direction where the insertion and withdrawal part 43 is moved. The thrust restriction hole 43*d* which penetrates to the focus hole 43*c* along the direction (direction which is orthogonal to the focus hole 43*c*) where the insertion and withdrawal part 43 is moved is formed on the other surface in the direction where the insertion and withdrawal part 43 is moved. In addition, the rotation restriction hole 43*e* which penetrates to the engagement hole 43*b* along a diagonal direction is formed on the other surface in the direction where the insertion and withdrawal part 43 is moved.

The cylindrical holding frame 44 is provided as the optical element holding member and is movably engaged in the engagement hole 43*b* along the incident illumination axis b. As for the holding frame 44, the hole part 44*a* to pass the illumination internally is provided as a concentric circle, and the threaded region 44*b* is provided to fix an optical element (pinhole 45 described later) to the side of surroundings on the inside of the holding frame 44. The focus ditch 44*c* along the circumferential direction and the rotation restriction ditch 44*d* along incident illumination axis b are formed on the outer side of the holding frame 44.

The holding frame 44 has a cylindrical hollow part, and the pinhole 45 having a minute hole 45*a* contacting the hole part 44*a* in the hollow part is inserted as an optical element. In addition, by screwing the suppression member 46 having the hole 46*a* to pass the illumination and on which the threaded region 46*b* is formed on an outer surface thereof into the threaded region 44*b*, the pinhole 45 is fixed in holding frame 44.

By inserting the restriction pin 47 through the rotation restriction hole 43*e* in the insertion and withdrawal part 43, the point part of the restriction pin 47 is engaged with the rotation restriction ditch 44*d* of the holding frame 44, and the movement of the direction where the holding frame 44 is rotated is restricted to move along the direction of the incident illumination axis b.

Moreover, the focus axis 48 which configures a part of the focus mechanism is rotatably inserted in the focus hole 43*c* of the insertion and withdrawal part 43. This focus axis 48 has the ditch part 48*c* along a circumferential direction in the middle part thereof. In addition, on the point surface of the focus axis 48, the pin 48*a* connected with the focus ditch 44*c* of holding frame 44 is provided. In this case, the pin 48*a* is eccentrically provided from the rotation axis of the focus axis 48. Therefore, the whole holding frame 44 moves along the direction of the incident illumination axis b by circular movement of the pin 48*a* around the axis line of the focus axis 48 along with the rotation of focus axis 48, and the circular movement is converted into the straight line movement by the focus ditch 44*c*. Moreover, the focus axis 48 has the hole part 48*b* for tool insertion on the edge surface on the base edge side. And, the focus axis 48 rotates in a state that the tool point (not shown in the drawings) is inserted into the hole part 48*b*.

In addition, the thrust pin 49 is inserted in the thrust restriction hole 43*d* of the insertion and withdrawal part 43 by screwing. The thrust pin 49 has a projection 49*a* inserted in the ditch part 48*c* of the focus axis 48 at the point thereof. The thrust direction of the focus axis 48 is restricted with this projection 49*a* connected with the ditch part 48*c*.

On the other hand, an insertion and withdrawal knob 50 is provided to the insertion and withdrawal part 43. By the insertion and withdrawal knob 50, the slide movement of the insertion and withdrawal part 43 is operated.

The insertion and withdrawal part 43 held by the centering frame 42 and the slide ditch 42*a* of the centering frame 42 restricts the movement of the direction of the incident illumination axis b by the suppression board 51 (see FIG. 3A and FIG. 3D) fixed to the outer frame 36 with the screw etc.

Next, a case where the incident illumination unit configured as mentioned above is installed in the incident illumination device 2 instead of the field stop unit 10 will be explained.

First of all, the field stop unit 10 attached to the incident illumination device 2 is detached from the installation slot 20. And, the incident illumination unit is inserted according to the recessed ditch part 22. In this case, the incident illumination unit is inserted in the space enclosed by the ditch part 22 and the ceiling 24, and the incident illumination unit is moved until surfaces 30, 31, 32, and 33 are installed. The contact surface 34 is contacted to the contact surface 25 on the installation slot 20, and in addition, the fixing screw 35 screws in the fixing screw hole 26 and the incident illumination unit is fixed to the incident illumination device 2.

Next, the procedure when the illumination is irradiated only within the minute area with an incident illumination unit will be explained.

In this case, in a state that the microscope can observe the incident fluorescence, first of all, by moving the insertion and withdrawal knob 50 along the direction of the arrow of FIG. 3B, the insertion and withdrawal part 43 is pushed until the stopper 43*a* is contacted to the stopper contact surface 42*c*1 of the guide ditch 42*c* of the centering frame 42, and the minute hole 45*a* of the pinhole 45 is moved within the observation area.

Next, the tool (not shown in the drawings) is inserted from the machine screw holes 38*a* and 38*b* of the board 38, and the amount of pushing of the centering machine screws 37*a* and 37*b* is adjusted by the centering screw holes 36*g*1 and 36*g*2 of the outer frames 36. As a result, the centering frame 42 moves in a plane perpendicular to the incident illumination axis b around the centering pin 42*f* inserted through the length hole 36*e* of the outer frame 36, and the centering that the minute hole 45*a* of pinhole 45 is matched on the incident illumination axis b is performed. In this case, the centering frame 42 follows and moves by the adjustment of the screwing of the centering machine screws 37*a* and 37*b*, because of the contact of the contact surfaces 42*d*1 and 42*d*2 of the centering frame 42 to the points of the centering machine screws 37*a* and 37*b* due to the centering spring 431.

Next, the focus is adjusted so that illumination through the pinhole 45 is projected on the specimen 4 according to the used illumination wavelength and objective.

The focus adjustment is performed as follows. First of all, the (tool not shown in the drawings) is inserted in hole part 48*b* for tool insertion on the edge surface of the focus axis 48, and the focus axis 48 is rotated. Then, the whole holding frame 44 moves along the direction of the incident illumination axis b through the focus ditch 44*c* by the circular movement of the pin 48*a* around the axis line of the focus axis 48 along with the rotation of the focus axis 48.

The illumination area of the incident illumination is restricted by the pinhole 45 by such an operation, and only the incident illumination which has passed the minute hole 45*a* above specimen 4 is projected.

Next, a case where the usual entire field is illuminated will be explained. In this case, the insertion and withdrawal knob 50 is operated in the opposite direction to the direction of the arrow shown in FIG. 3B. And, by drawing out the insertion and withdrawal part 43 until the stopper 43*a* is contacted to the stopper contact surface 42*c*2 of the guide ditch 42*c* of the centering frame 42, the pinhole 45 is removed from the incident illumination axis b in the insertion and withdrawal part 43. Under such a condition, because there is no restriction of the illumination area by the pinhole 45, it becomes possible to illuminate the entire field.

When the illumination is irradiated again only within the minute range, it becomes possible to return to the state adjusted last time easily by pushing the Insertion and withdrawal knob 50.

Therefore, with this method, it is possible to position the incident illumination unit compactly configured in place of the field stop unit 10 at a predetermined position of the incident illumination device 2 and install it with ease and good repeatability.

The pinhole 45 can be moved within the observation area by operating the insertion and withdrawal knob 50 while installing the incident illumination unit in the incident illumination device 2. In addition, the centering that the pinhole 45 is matched on the incident illumination axis b by adjusting the amount of the screwing of the centering machine screws 37*a* and 37*b* can be performed. In addition, the focus adjustment can be performed by rotating the focus axis 48. Therefore, the illumination area is restricted by the pinhole 45 with an easy operation and the adjustment work and the incident illumination can be projected accurately on the specimen 4.

In the first embodiment, the case to restrict the illumination area is described by using the pinhole 45. It is not limited to this, and the element with the arbitrary hole shape may be used instead of the pinhole 45. The illumination area may be arbitrarily set like this.

(Second Embodiment)

Next, the second embodiment will be explained.

In the second embodiment, since the microscope (upright frame) which comprises the incident illumination device in which the incident illumination unit can be installed, the installation slot part of the field stop unit and the aperture stop unit provided to the incident illumination device, and the incident illumination unit are similar to those shown in FIG. 1 to FIG. 3D as mentioned above, figures and explanation thereof will be omitted.

Figure 5:
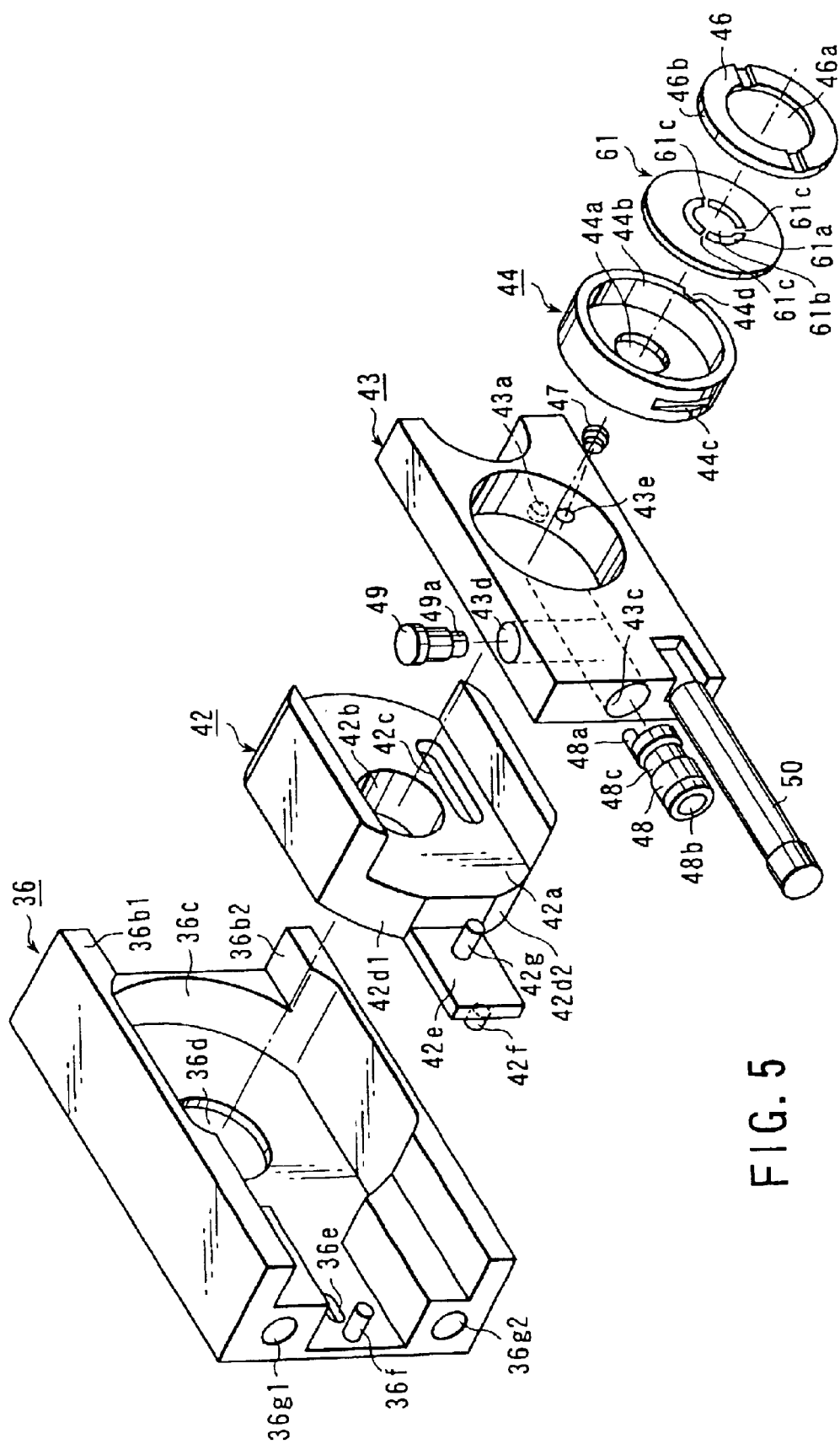
FIG. 5 is a decomposition oblique perspective of the incident illumination unit of the second embodiment.

FIG. 5 is a figure which shows a decomposition oblique perspective figure of the incident illumination unit to which the second embodiment is applied. In FIG. 5, same symbols are fixed to the same parts as FIG. 4, and a detailed explanation will be omitted.

In FIG. 5, the ring slit 61 is inserted to contact to the hole part 44a in the hollow part of the toroidal holding frame 44. The ring slit 61 has a slit 61a formed in a ring belt shape along the circumferential direction of the surrounding edge part and a light shielding part 61b formed in the center part and supported by two or more (three shown in FIG. 5) connection parts 61c and the ring slit 61. The outside diameter of the light shielding part 61b is set in the size in which the specimen 4 can be illuminated from the outside of NA (numerical aperture) of the objective.

Next, a case where the incident illumination unit configured as mentioned above is installed in the incident illumination device 2 instead of the aperture stop unit 11 will be explained.

First of all, the aperture stop unit 11 attached to the incident illumination device 2 is detached. And, the incident illumination unit is inserted according to ditch part 22 with recess shape. In this case, the incident illumination unit is moved until the incident illumination unit is inserted in the space enclosed by the ditch part 22 and the ceiling 24 and surfaces 30, 31, 32, and 33 are installed. The contact surface 34 is contacted to the contact surface 25 on the installation slot 20, and the fixing screw 35 screws in the fixing screw hole 26 to fix the incident illumination unit to the incident illumination device 2.

Under such a condition, the insertion and withdrawal knob 50 is moved to the pushing direction as well as the first embodiment. And, the ring slit 61 is moved within the observation area. Next, the ring slit 61 is matched on the incident illumination axis b by adjusting the amount of screwing of the centering machine screws 37a and 37b.

Next, by rotating the focus axis 48, all of the holding frame 44 is moved through the focus ditch 44c along the direction of the incident illumination optical axis b, the ring slit 61 is moved to the conjugate position to the rear focus position of the objective 6.

When the incident illumination observation is performed after such a ring slit 61 is positioned, the illumination passes outside of the observation light path in the objective 6, so that the self-fluorescence which occurs in the observation light path of the objective 6 can be suppressed. Therefore, it becomes possible to obtain a fluorescent image with good contrast.

Figure 6:
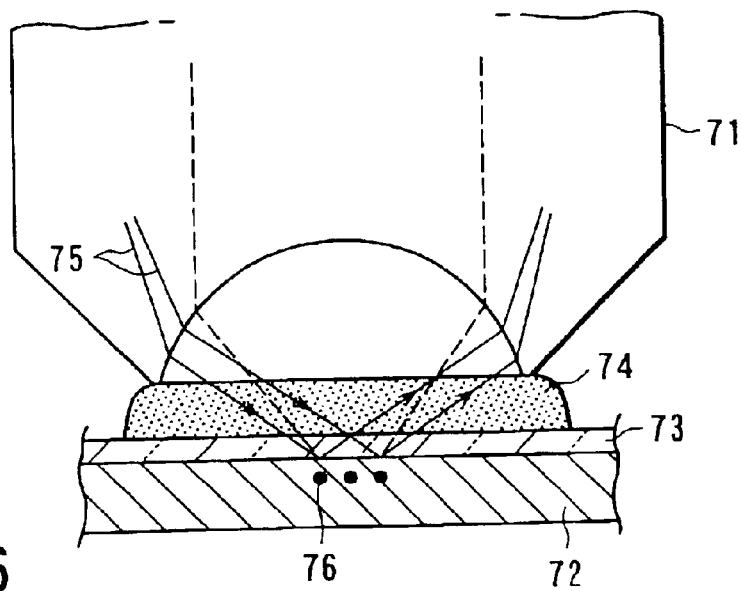
FIG. 6 shows an application example of the second embodiment.

By using such an incident illumination unit, for instance, as shown in FIG. 6, according to each refractive index of NA of objective 71, the glass cover 73 to the cover specimen 72, and the immersion oil 74 filled between the objective 71 and the glass cover 73, it becomes possible to perform total reflection of the illumination 75 in the interface of the glass cover 73 and the specimen 72. It also becomes possible to perform evanescent field illumination by using the evanescent wave 76 which is exuded to the interface at this time.

The inverted microscope can be similarly applied though a case of applying the microscope (upright frame) is explained in each above-mentioned embodiment. In addition, it is useful when necessary optical elements to be positioned are combined with the incident illumination axis such as a supplementary lens other than the pinhole and the ring slit.

The following inventions are extracted from each above-mentioned embodiment. Each of the following inventions may be applied solely and may be applied by combining them.

An incident illumination unit which can be installed in a slot of an incident illumination device to which a field stop unit or an aperture stop unit is installed, according to a first aspect the present invention is characterized by comprising: an optical element holding part configured to hold an optical element; a focus mechanism which moves the optical element holding part along an incident illumination axis of the incident illumination device; an insertion and withdrawal mechanism which moves the focus mechanism to a vertical direction to the incident illumination axis; and a outer frame which integrally accommodates the optical element holding part, the focus mechanism and the insertion and withdrawal mechanism and has a slot shape which is inserted and positioned to the slot part of the incident illumination device.

An incident illumination unit which can be installed in a slot of the incident illumination device to which a field stop unit or an aperture stop unit is installed, according to a second aspect of the present invention is characterized by comprising: an optical element holding part configured to hold an optical element and have a focus ditch at a lateral face thereof; an insertion and withdrawal part having a focus hole (43c) which can move the optical element holding part along a direction of an incident illumination axis and engage it along an orthogonal direction to the incident illumination axis and penetrates to an engagement hole; a centering part which is movable and rotatable in a vertical plane to the incident illumination axis; a outer frame having a slot shape, which accommodates the optical element holding part, the insertion and withdrawal part, and the centering part as one body, and is inserted and positioned in the slot part of the incident illumination device, wherein the focus axis having a pin provided eccentrically to a point surface is inserted in the focus hole, the pin is connected with a focus ditch formed on an outer surface of the optical element holding part along a circumferential direction, the insertion and withdrawal part is formed in a direction along the slide ditch, is inserted in a guide ditch (42c) having two stopper contact surfaces which restrict a range of movement of the insertion and withdrawal part and has a stopper (43a) which can contact a stopper contact surface by moving the insertion and withdrawal part, a couple of centering machine screws which are arranged at a symmetrical position to a length direction center line of the length hole of the outer frame and contacted to a lateral surface of the centering part and a centering spring which draws in the centering part in a direction in the contact to the centering machine screw are installed in the outer frame, and the centering part is inserted in the length hole formed to the outer frame, moves along the length hole and turns around the length hole.

In above-mentioned incident illumination units, the following forms may be preferable. The following forms can adopted solely or by combining them.

(1) a centering mechanism (36g1, 36g2, 42) which moves the insertion and withdrawal mechanism in a vertical plane to the incident illumination axis is further provided.

(2) The optical element includes an optical element which is necessary to be positioned for the incident illumination axis.

(3) The focus mechanism comprises a focus axis having a pin which is inserted to a focus hole which penetrates to an engagement hole which engages the optical element holding part which can be moved along a direction of the incident illumination axis, along an orthogonal direction for the incident illumination axis, and is provided eccentrically to the point surface, and is connect with the focus ditch in which the pin is formed on the outer side of the optical element holding part along a circumferential direction, a thrust restriction mechanism which restricts a thrust direction of the focus axis, and the optical element holding part is moved by a rotation operation of a focus axis by a circular movement of the pin around the axis line of the focus axis through the focus ditch along the incident illumination axis.

(4) The focus axis has a ditch part formed in the middle part thereof along the circumferential direction, and the thrust mechanisms has a thrust pin which is inserted in a thrust restriction hole (43d) which penetrates to the focus hole along an orthogonal direction in the optical axis direction which passes the focus hole, and is connected the point part with the ditch part of the said focus axis and restricts the direction of thrust of the said focus axis.

(5) The insertion and withdrawal mechanism comprises: an insertion and withdrawal member provided slidably and movably along a slide ditch of the centering part; and a stopper which is inserted in a guide ditch which is provided to the insertion and withdrawal part and is formed in a direction along the slide ditch, and has two stopper contact surfaces which restrict a range of movement of the insertion and withdrawal part, and can touch the stopper contact surfaces by moving the insertion and withdrawal part.

(6) The centering mechanism comprises a centering member which is inserted in a length hole formed to the outer frame, and enables a rotation around the length hole and a movement along the length hole, a couple of centering machine screws which are arranged at symmetric position for a length direction center line of the length hole of the outer frame and is touched to a lateral face of the centering member, and a centering spring which draws in the centering member to a direction contacted to the centering machine screw, and the centering member is centered and moved by adjusting a pushing amount of a lateral surface of the centering member by the couple of the centering machine screws.

(7) The couple of the centering screws are arranged in parallel mutually.

(8) The slot part has an opening, a ditch part for unit insertion and withdrawal formed inside the opening and in a direction orthogonal to the incident illumination axis, and a contact surface for fixing the incident illumination unit to the ceiling and the opening provided opposing to the ditch part, and the incident illumination unit has four surfaces which are installed in the space enclosed by the ditch part and the ceiling, and unit contact surfaces which are fixed to the opening by contacting to the contact surface.

A microscope according to a third aspect of the present invention is characterized by comprising: an incident illumination device which comprises a lamp house; an incident illumination unit installed detachably/attachably to the incident illumination device as described above; and an eyepiece to observe a light from a sample.

In the third aspect, it is preferable that the slot part has an opening, a ditch part for the unit insertion and withdrawal formed in a direction which is in the opening orthogonal to the incident illumination axis, and a contact surface for the fixation of the incident illumination unit to the ceiling and the opening provided opposing to the ditch part, and the incident illumination unit has four surfaces which are installed in the space enclosed by the ditch part and the ceiling and unit contact surfaces which are fixed to the opening contacting to the contact surface.

Additionally, the present invention is not limited to the above-mentioned embodiments, but can be variously transformed within the scope of the invention.

In addition, above-mentioned embodiments include various steps of the invention, and various inventions can be extracted by a proper combination of disclosed plurality of configuration elements. For instance, even if the several configuration elements are deleted from all configuration elements shown in the embodiments, when the problem can be solved and the advantage can be obtained, the configuration from which this configuration elements are deleted can be extracted as an invention.

As described above, according to the present invention, the incident illumination unit, in which an arbitrary optical element can be adjusted and arranged at an arbitrary position of the incident illumination axis and the insertion and withdrawal onto/from the incident illumination axis can be easily performed, can be provided.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. An incident illumination unit for detachable insertion into a slot part of an incident illumination device, said illumination unit comprising:

an outer frame having a slot-shape which is positioned in the slot part;

a centering frame which is adjustably positioned within the outer frame in a plane perpendicular to an incident illumination axis;

an insertion and withdrawal part provided inside the centering frame so as to be movable onto and off from the incident illumination axis;

an optical element holding part held in the insertion and withdrawal part so as to be movable along the incident illumination axis within the insertion and withdrawal part when the insertion and withdrawal part is positioned on the incident illumination axis; and an optical element which is detachably held in the optical element holding part;

wherein at least one of a field stop unit and an aperture stop unit is also detachably insertable in the slot part of the incident illumination device in place of the incident illumination device.

2. The incident illumination unit according to claim 1, wherein a position adjustment mechanism for the centering frame is provided at an opening part side with respect to the incident illumination axis.

3. The incident illumination unit according to claim 1, further comprising:

a focus axis having a point surface and a pin provided eccentrically to the point surface, wherein the focus axis is inserted into a focus hole in the insertion and withdrawal part that penetrates to an engagement hole in the insertion and withdrawal part so as to be connected to a focus ditch formed in an outer surface of the optical element holding part along a circumferential direction thereof; and a thrust restriction mechanism which restricts a thrust direction of the focus axis;

wherein the optical element holding part is movable in a direction orthogonal to the incident illumination axis and is moved along the incident illumination axis by a circular movement of the pin around an axis line of the focus axis through the focus ditch when the focus axis is rotated.

4. The incident illumination unit according to claim 3, wherein the focus axis includes a ditch part formed in a middle part thereof along a circumferential direction thereof, and wherein the thrust restriction mechanism comprises a thrust pin which is inserted in a thrust restriction hole in the insertion and withdrawal part which penetrates to the focus hole along a direction orthogonal to the focus hole, and which includes a point part which connects which the ditch part of the focus axis and restricts a direction of thrust of the focus axis.

5. The incident illumination unit according to claim 1, wherein the slot part of the incident illumination device comprises an opening part, a ditch part for insertion and withdrawal of the incident illumination device formed inside the opening part in a direction orthogonal to the incident illumination axis, a ceiling which is provided opposite to the ditch part, and a contact surface for fixing the incident illumination unit in the slot part; and wherein the incident illumination unit further comprises four surfaces which are installed in the slot part in a space enclosed by the ditch part and the ceiling, and unit contact surfaces which are fixed to the contact surface of the slot part.

6. A microscope comprising: an incident illumination device including the incident illumination unit according to claim 1; and an eyepiece to observe light from a sample.

7. The microscope according to claim 6, wherein the incident illumination device comprises a detachably provided lamp house which includes a light source.

8. An incident illumination unit for insertion in a slot part of an incident illumination device in which at least one of a field stop unit and an aperture stop unit is installed, said incident illumination unit comprising:

an optical element holding part which is adapted to hold an optical element and which has a focus ditch in a lateral face thereof along a circumferential direction;

an insertion and withdrawal part having a focus hole to move the optical element holding part along a direction of an incident illumination axis and to engage the optical element holding part along a direction orthogonal to the incident illumination axis, and which penetrates to an engagement hole;

a centering part which is movable and rotatable in a plane perpendicular to the incident illumination axis and which has a slide ditch formed therein;

an outer frame having a slot shape, which accommodates the optical element holding part, the insertion and withdrawal part, and the centering part as one body, and which is inserted and positioned in the slot part of the incident illumination device;

wherein a focus axis having a point surface and a pin provided eccentrically to the point surface is inserted into the focus hole of the insertion and withdrawal part such that the pin is connected with the focus ditch formed on the outer surface of the optical element holding part;

wherein the insertion and withdrawal part: (i) is formed in a direction along the slide ditch, (ii) is inserted in a guide ditch provided with two stopper contact surfaces respectively disposed at a first end and a second end of the guide ditch which restrict a range of movement of the insertion and withdrawal part, and (iii) has a stopper which is adapted to contact the stopper contact surfaces disposed at the first end and the second end of the guide ditch when the insertion and withdrawal part moves;

wherein at least two centering machine screws are installed in the outer frame at symmetric positions with respect to a length direction center line of a length hole formed in the outer frame, and contact a lateral surface of the centering part, and wherein a centering spring installed in the outer frame draws in the centering part toward the centering machine screw; and wherein the centering part is inserted in the length hole formed in the outer frame, moves along the length hole and turns around the length hole.

9. The incident illumination unit according to claim 8, wherein the centering part is centered and moved by adjusting a pushing amount on the lateral surface thereof by the at least two centering machine screws.

10. The incident illumination unit according to claim 9, wherein the at least two centering machine screws are arranged in parallel.

* * * * *